United States Patent
Luecht et al.

(10) Patent No.: US 11,948,119 B2
(45) Date of Patent: Apr. 2, 2024

(54) SYSTEMS AND METHODS FOR LOST ASSET MANAGEMENT USING PHOTO-MATCHING

(71) Applicant: ZEBRA TECHNOLOGIES CORPORATION, Lincolnshire, IL (US)

(72) Inventors: Andre Luecht, Odessa, FL (US); Andrea Mirabile, London (GB); Michele Taroni, London (GB); Chad E. Tripp, Jacksonville, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 96 days.

(21) Appl. No.: 17/538,009

(22) Filed: Nov. 30, 2021

(65) Prior Publication Data

US 2023/0169441 A1    Jun. 1, 2023

(51) Int. Cl.
*G06Q 10/08* (2023.01)
*G06F 16/583* (2019.01)
*G06V 10/22* (2022.01)

(52) U.S. Cl.
CPC .......... *G06Q 10/08* (2013.01); *G06F 16/583* (2019.01); *G06V 10/23* (2022.01)

(58) Field of Classification Search
CPC ....... G06Q 10/08; G06F 16/583; G06V 10/23
See application file for complete search history.

(56) References Cited

U.S. PATENT DOCUMENTS

| | | | |
|---|---|---|---|
| 2010/0223245 A1 | 9/2010 | Vermilye | |
| 2012/0089639 A1 | 4/2012 | Wang | |
| 2016/0259994 A1 | 9/2016 | Ravindran et al. | |
| 2017/0178227 A1* | 6/2017 | Graham | G06Q 30/0643 |
| 2018/0018627 A1 | 1/2018 | Ross et al. | |
| 2018/0144295 A1* | 5/2018 | Engel | G06Q 10/0833 |
| 2018/0349694 A1 | 12/2018 | Ross et al. | |
| 2022/0185318 A1* | 6/2022 | Ehara | B60W 40/09 |

OTHER PUBLICATIONS

International Search Report and Written Opinion for International Patent Application No. PCT/US2022/43458 dated Jan. 17, 2023.

\* cited by examiner

*Primary Examiner* — A. Hunter Wilder

(57) ABSTRACT

Systems and methods for lost asset management using photo-matching are disclosed herein. An example method includes capturing a lost asset image corresponding to a lost asset, and generating, by a feature extractor model, a lost asset descriptor that represents features of the lost asset image. The example method also includes storing the lost asset descriptor and the lost asset image in an asset database that includes known asset descriptors, and performing, by a visual search engine, a nearest neighbor search within the asset database to determine a respective metric distance between the lost asset descriptor and the known asset descriptors. The example method also includes determining, by the visual search engine, a ranked list of known assets corresponding to the lost asset, and displaying, at a user interface, the ranked list of known assets for viewing by a user.

14 Claims, 5 Drawing Sheets

SYSTEMS AND METHODS FOR LOST ASSET MANAGEMENT USING PHOTO-MATCHING

BACKGROUND

The Less-than-Truckload (LTL) industry provides valuable transportation services for small freight and small load shipments, and as a result, faces a significant financial burden from individual pallets/handling units not reaching their intended destination on time. Typically, if an individual pallet/handling unit reaches a shipping hub without an associated or otherwise readable identifier (e.g., a label, barcode, or the like), that individual pallet/handling unit may be designated as an unknown overage (referenced herein as "orphaned"). Absent theft or actual loss, these pallets/handling units without identifiers are typically collected in a dedicated warehouse/cross-dock section for overages, shortages and damages (OS&D). These orphaned pallets/handling units typically result in customer claims (e.g., seeking financial compensation) for loss or delivery service delays.

Conventional systems and methods for identifying orphaned pallets/handling units, and thereby avoid customer claims, are slow and ineffective. Conventionally, LTL providers designate an individual to review, inspect, and attempt to identify a shipper and a recipient for each item in the OS&D area. If successful, the individual will typically write the product number on a piece of paper and attach (e.g., tape) the piece of paper to the pallet/handling unit and ensure that the pallet/handling unit is transported onward to the subsequent destination. However, this manual process takes a significant amount of labor, is often unsuccessful due to a general lack of information regarding the orphaned pallet/handling unit, and eliminates the potential benefit of any downstream identifier (e.g., barcode) capture as the pallet/handling unit is transported to its intended destination.

Thus, there exists a need for improved systems and methods for lost asset management using photo-matching to ensure quick, efficient, and effective identification and processing of orphaned pallets/handling units.

SUMMARY

In an embodiment, the present invention is a method for lost asset management using photo-matching. The method may comprise: capturing, by an imaging device, a lost asset image corresponding to a lost asset; generating, by applying a feature extractor model to the lost asset image, a lost asset descriptor that represents features of the lost asset image; storing the lost asset descriptor and the lost asset image in an asset database, wherein the asset database includes known asset descriptors and corresponding known asset images; performing, by a visual search engine, a nearest neighbor search within the asset database to determine a respective metric distance between the lost asset descriptor and at least some of the known asset descriptors; determining, by the visual search engine, a ranked list of known assets corresponding to the lost asset, wherein the ranked list of assets is prioritized based on the respective metric distance between the lost asset descriptor and the at least some of the known asset descriptors; and displaying, at a user interface, the ranked list of known assets for viewing by a user.

In a variation of this embodiment, the method further comprises: identifying, by one or more processors coupled to the imaging device, the lost asset within the lost asset image; and localizing, by the one or more processors, the lost asset by removing background noise from the lost asset image.

In another variation of this embodiment, the imaging device is a first imaging device at an orphaned asset bay, and the method further comprises: capturing, by a second imaging device coupled to a transportation management system (TMS), an initial image of the lost asset prior to transporting the lost asset; storing, in the asset database, the initial image and an initial descriptor generated from the initial image; registering, by the TMS, a shortage of assets corresponding to the lost asset in the asset database when a designated transportation vehicle arrives at a destination of the lost asset without the lost asset; and comparing, by the visual search engine, at least the initial descriptor to the lost asset descriptor as part of the nearest neighbor search.

In yet another variation of this embodiment, the feature extractor model is a convolutional neural network (CNN) trained with plurality of training asset images to output a plurality of training descriptors that represent features of the plurality of training asset images.

In still another variation of this embodiment, for each known asset represented in the asset database, the asset database further includes one or more of (i) an asset location, (ii) an asset routing, (iii) an asset size, (iv) an asset pallet type, (v) an asset date, or (vi) an asset delivery status.

In yet another variation of this embodiment, the method further comprises: receiving, from the user, an indication that no known asset listed on the ranked list of known assets corresponds to the lost asset; re-performing, by the visual search engine, the nearest neighbor search within the asset database by including (i) the asset location, (ii) the asset routing, (iii) the asset size, (iv) the asset pallet type, (v) the asset date, or (vi) the asset delivery status for at least some of the known assets to determine a respective new metric distance between data stored in the asset database representing the lost asset and the at least some of the known assets; determining, by the visual search engine, a new ranked list of known assets corresponding to the lost asset, wherein the new ranked list of known assets is prioritized based on the respective new metric distance between the data stored in the asset database representing the lost asset and the at least some of the known assets; and displaying, at the user interface, the new ranked list of known assets for viewing by the user.

In still another variation of this embodiment, the lost asset descriptor and the known asset descriptors correspond to vectors including real numbers, and the metric distance corresponds to differences between respective vectors associated with the known asset descriptors and the lost asset descriptor.

In another embodiment, the present invention is a system for lost asset management using photo-matching. The system comprises: an imaging device configured to capture a lost asset image corresponding to a lost asset; and one or more processors communicatively coupled with the imaging device. The one or more processors are configured to: generate, by applying a feature extractor model to the lost asset image, a lost asset descriptor that represents features of the lost asset image, store the lost asset descriptor and the lost asset image in an asset database, wherein the asset database includes known asset descriptors and corresponding known asset images, perform a nearest neighbor search within the asset database to determine a respective metric distance between the lost asset descriptor and at least some of the known asset descriptors, determine a ranked list of known assets corresponding to the lost asset, wherein the ranked list of assets is prioritized based on the respective metric distance between the lost asset descriptor and the at least some of the known asset descriptors, and cause a user interface to display the ranked list of known assets for viewing by a user.

In a variation of this embodiment, the one or more processors are further configured to: identify the lost asset within the lost asset image; and localize the lost asset by removing background noise from the lost asset image.

In another variation of this embodiment, the imaging device is a first imaging device at an orphaned asset bay, and the system further comprises: a second imaging device configured to capture an initial image of the lost asset prior to transporting the lost asset; and wherein the one or more processors are further configured to: store, in the asset database, the initial image and an initial descriptor generated from the initial image, register a shortage of assets corresponding to the lost asset in the asset database when a designated transportation vehicle arrives at a destination of the lost asset without the lost asset, and compare at least the initial descriptor to the lost asset descriptor as part of the nearest neighbor search.

In yet another variation of this embodiment, the feature extractor model is a convolutional neural network (CNN) trained with plurality of training asset images to output a plurality of training descriptors that represent features of the plurality of training asset images.

In still another variation of this embodiment, for each known asset represented in the asset database, the asset database further includes one or more of (i) an asset location, (ii) an asset routing, (iii) an asset size, (iv) an asset pallet type, (v) an asset date, or (vi) an asset delivery status.

In yet another variation of this embodiment, the one or more processors are further configured to: receive, from the user, an indication that no known asset listed on the ranked list of known assets corresponds to the lost asset; re-perform the nearest neighbor search within the asset database by including (i) the asset location, (ii) the asset routing, (iii) the asset size, (iv) the asset pallet type, (v) the asset date, or (vi) the asset delivery status for at least some of the known assets to determine a respective new metric distance between data stored in the asset database representing the lost asset and the at least some of the known assets; determine a new ranked list of known assets corresponding to the lost asset, wherein the new ranked list of known assets is prioritized based on the respective new metric distance between the data stored in the asset database representing the lost asset and the at least some of the known assets; and cause the user interface to display the new ranked list of known assets for viewing by the user.

In still another variation of this embodiment, the lost asset descriptor and the known asset descriptors correspond to vectors including real numbers, and the metric distance corresponds to differences between respective vectors associated with the known asset descriptors and the lost asset descriptor.

In yet another embodiment, the present invention is a tangible machine-readable medium comprising instructions that, when executed, cause a machine to at least: receive a lost asset image corresponding to a lost asset; generate, by applying a feature extractor model to the lost asset image, a lost asset descriptor that represents features of the lost asset image; store the lost asset descriptor and the lost asset image in an asset database, wherein the asset database includes known asset descriptors and corresponding known asset images; perform a nearest neighbor search within the asset database to determine a respective metric distance between the lost asset descriptor and at least some of the known asset descriptors; determine a ranked list of known assets corresponding to the lost asset, wherein the ranked list of assets is prioritized based on the respective metric distance between the lost asset descriptor and the at least some of the known asset descriptors; and cause a user interface to display the ranked list of known assets for viewing by a user.

In a variation of this embodiment, the instructions, when executed, further cause the machine to at least: identify the lost asset within the lost asset image; and localize the lost asset by removing background noise from the lost asset image.

In another variation of this embodiment, the instructions, when executed, further cause the machine to at least: receive an initial image of the lost asset prior to transporting the lost asset; store, in the asset database, the initial image and an initial descriptor generated from the initial image; register a shortage of assets corresponding to the lost asset in the asset database when a designated transportation vehicle arrives at a destination of the lost asset without the lost asset; and compare at least the initial descriptor to the lost asset descriptor as part of the nearest neighbor search.

In yet another variation of this embodiment, the feature extractor model is a convolutional neural network (CNN) trained with plurality of training asset images to output a plurality of training descriptors that represent features of the plurality of training asset images.

In still another variation of this embodiment, for each known asset represented in the asset database, the asset database further includes one or more of (i) an asset location, (ii) an asset routing, (iii) an asset size, (iv) an asset pallet type, (v) an asset date, or (vi) an asset delivery status.

In yet another variation of this embodiment, the instructions, when executed, further cause the machine to at least: receive, from the user, an indication that no known asset listed on the ranked list of known assets corresponds to the lost asset; re-perform the nearest neighbor search within the asset database by including (i) the asset location, (ii) the asset routing, (iii) the asset size, (iv) the asset pallet type, (v) the asset date, or (vi) the asset delivery status for at least some of the known assets to determine a respective new metric distance between data stored in the asset database representing the lost asset and the at least some of the known assets; determine a new ranked list of known assets corresponding to the lost asset, wherein the new ranked list of known assets is prioritized based on the respective new metric distance between the data stored in the asset database representing the lost asset and the at least some of the known assets; and cause the user interface to display the new ranked list of known assets for viewing by the user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
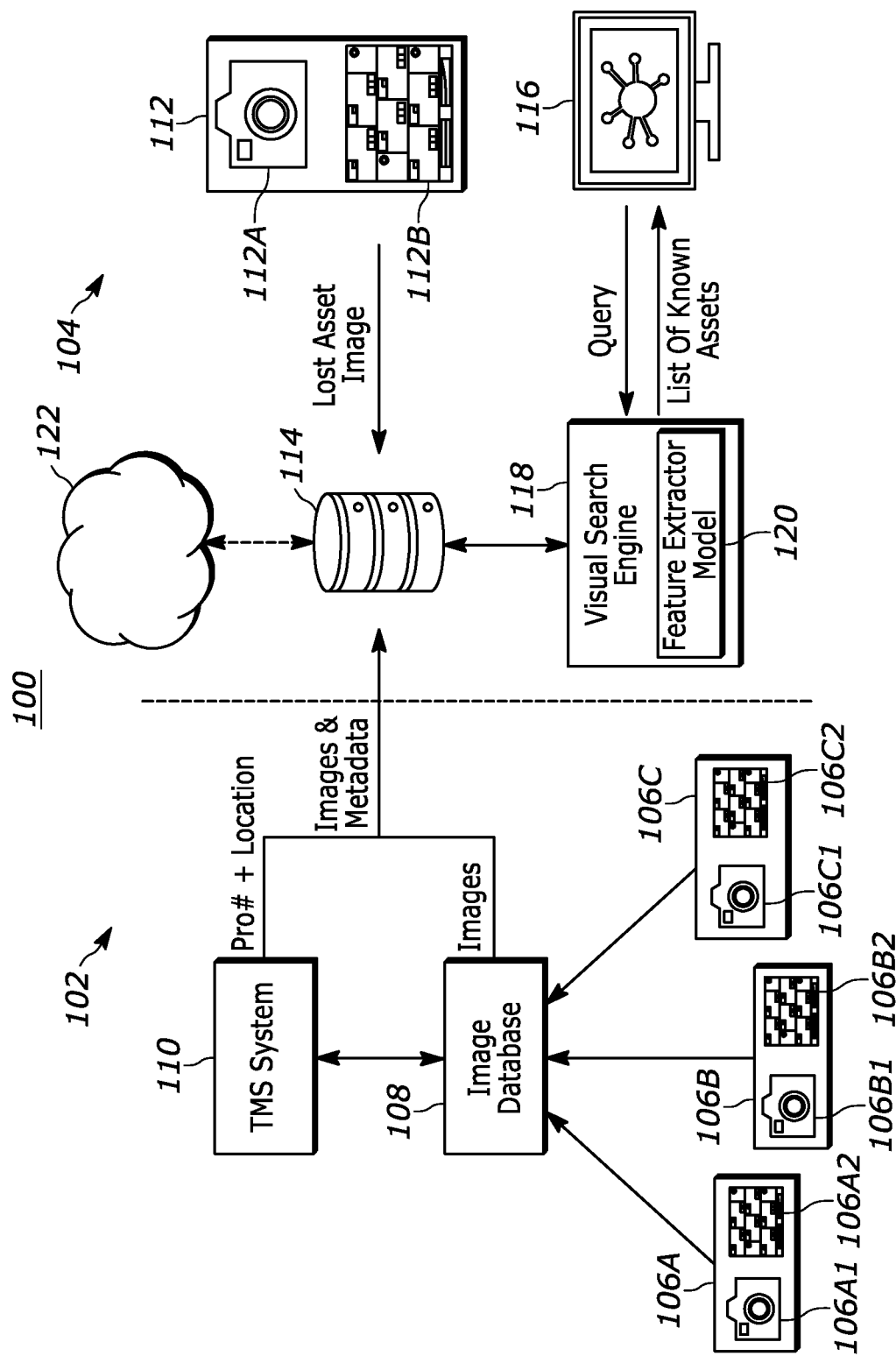
FIG. 1 is an example system configured for lost asset management using photo-matching, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally, Less-than-Truckload (LTL) service providers have a need to quickly identify and properly route orphaned pallets/handling units (referenced herein as a "lost asset") in order to avoid delays, crowding of storage areas, and overall transportation inefficiencies resulting from a lack of information corresponding to these lost assets. Typically, this is difficult to accomplish for conventional techniques that utilize manual evaluation of each lost asset, as this involves a significant amount of labor and is highly unreliable. The techniques described herein address these difficulties and other issues by providing a solution which helps improve the speed, accuracy, consistency, and efficiency of the lost asset identification/routing process.

Specifically, the techniques disclosed herein utilize a combination of a visual search engine and a feature extraction model that are applied to information regarding each asset that is gathered prior to and after arriving at an OS&D area. For example, in order to assess volumetric weight, most LTL shipments (primarily on pallets) will be subject to dimensioning, which involves measuring the size of the shipment and capturing one or more images of its state (e.g., wrapped, not damaged, banded, etc.). This dimensioning information is used to plan and optimize capacity on trucks as well as document the state of the shipment upon arrival at the carrier. Similar images may be captured of the asset once it arrives at an OS&D area, such that the techniques of the present disclosure (e.g., the feature extraction model and the visual search engine) may compare these OS&D images to the dimensioning system images to identify the lost asset.

As another example, most LTL carriers operate a hub-and-spoke system of multiple supply chain nodes, wherein each origin/destination pair (e.g. Miami to Chicago) follows a pre-determined routing that optimizes the number of stops, miles traveled, cost, and transit time to the customer. This routing information is typically calculated by a Transport Management System (TSM) based on the provider's network footprint and printed on the label affixed to and/or otherwise associated with the asset. Thus, based on the location of the OS&D area, the present techniques may narrow the list of potential matching assets to the lost asset by evaluating all assets that would have been transported to/through the location of the OS&D area containing the lost asset. However, as described herein, the present techniques may utilize multiple different data types related to the lost asset(s) when identifying the lost asset(s), such as captured images (e.g., derived from captured images), relevant dates (e.g., shipment date, arrival date at OS&D area), relevant locations (e.g., intermediate location in hub-and-spoke system of supply chain nodes), routing guides, pallet type (e.g., color, material, size), packaging material (e.g., cardboard, shrink wrap), or the like.

The feature extraction model may include one or more trained machine learning (ML) models in order to leverage the speed and efficiency advantages provided by such models when evaluating the data collected by, for example, the dimensioning system(s) and the TSM system. Broadly, these ML models may be trained with a plurality of training asset images to output a plurality of training descriptors that represent features of the plurality of training asset images. For example, the feature extractor model may be a convolutional neural network (CNN) trained to analyze the input dimensioning area images and the input OS&D area images and output descriptors corresponding to each input image. These descriptors may generally represent features of the assets represented within the images (e.g., size, shape, color, etc.), such that the visual search engine may compare features across images to determine which asset represented within an input dimensioning area image(s) corresponds to the lost asset represented within the input OS&D area image(s). Of course, it should be understood that the "features" discussed herein may include features represented in the image (e.g., asset shape, size, color, etc.), features of the image (e.g., brightness, contrast, etc.), data derived from the image (e.g., indicia payloads, readable text from OCR, etc.), and/or any other suitable data type or combinations thereof. As a result, the techniques of the present disclosure identify and process/manage (e.g., route and ship) lost assets to a degree that is unattainable with conventional techniques.

Thus, the techniques of the present disclosure improve over conventional techniques at least by utilizing a combination of the feature extraction model (e.g., ML models) and the visual search engine in a manner that accurately, efficiently, and consistently performs lost asset identification/management on images and data of the lost assets that was previously unachievable by the conventional techniques. Moreover, as a result of the techniques of the present disclosure, LTL service providers receive high quality lost asset identification and management that provides valuable resolution to transportation issues arising from misplacing and/or otherwise losing assets during shipment that can cause extensive delays and overcrowding at asset storage locations. Thus, LTL service providers utilizing the techniques of the present disclosure may act to quickly resolve these issues, thereby increasing overall transportation efficiency, reducing storage requirements/capacity concerns at individual shipping locations, and increasing customer satisfaction due to more on-time deliveries.

FIG. 1 is an example system 100 configured for lost asset management using photo-matching, in accordance with embodiments described herein. In the example embodiment of FIG. 1, the system 100 includes a frontend 102 where each asset is imaged and characterized prior to transportation, and a backend 104 where a lost asset is imaged, characterized, and compared to the assets from the frontend 102. Generally speaking, the components included within the frontend 102 and the backend 104 may be capable of executing instructions to, for example, implement operations of the example methods described herein, as may be represented by the flowcharts of the drawings that accompany this description. Of course, it should be appreciated that the components included as part of the frontend 102 and the backend 104 may be distributed, subdivided, and/or otherwise separated in any suitable manner, and that the frontend 102 and the backend 104 designations are for the purposes of discussion only.

In any event, the frontend 102 generally includes a set of dimensioning sites 106A, 1066, and 106C that assess the volumetric weight of each asset arriving at a respective dimensioning site 106A-C, by utilizing imaging devices 106A1, 106B1, 106C1 to capture images of the respective assets 106A2, 10662, 106C2 for storage. Each image is uploaded to an image database 108 where the images are stored, and eventually sent to the backend 104 in order to identify and manage a lost asset. Moreover, information contained on a label and/or otherwise corresponding to each asset 106A2, 106B2, 106C2 may be uploaded to the Transport Management System (TMS) system 110 where the information may be stored and used to determine, for example, routing information corresponding to each asset 106A2, 10662, 106C2. The information uploaded to the image database 108 (e.g., images) and the TMS system 110 (e.g., product identification information, shipment intake location, etc.) may be transmitted across a network to the backend 104 as a set of images and metadata associated with the images.

For example, a user may upload a product identification number and a transportation destination corresponding to a particular asset 106A2, and the TMS system 110 may calculate a projected transportation route including multiple (at least a beginning and a destination) supply chain nodes where the asset 106A2 may be transported in route to the destination. As part of this calculation, the TMS system 110 may apply a set of criterion configured to optimize the number of stops, the number of miles traveled, the cost, the overall travel time, and/or any other suitable metrics that may be of importance when evaluating an optimal route by which the asset 106A2 may be transported to the destination. These criterion may be embodied as a set of rules-based decisions stored in memory (not shown) accessible by or on the TMS system, and/or the criterion may be part of a machine learning based algorithm configured to evaluate input factors of assets (e.g., destination, size, product type, etc.) and determine an optimal transportation route. All of this information may be stored in memory at the frontend 102 and/or sent to the backend 104, where it is stored for further evaluation.

The backend 104 includes a database 114 that is configured to receive and store data from the frontend 102 as well as from the OS&D area 112 that may currently have a lost asset 112B. The OS&D area 112 may include imaging devices 112A configured to capture images of the lost asset 112B, which the devices 112A may transmit across the network to the database 114 where the images are stored. Generally, any of the imaging devices 112A, 106A1, 10661, and 106C1 may include a digital camera and/or digital video camera for capturing or taking digital images and/or frames. Each digital image may comprise pixel data that may be analyzed by one or more components in the system 100 (e.g., feature extractor model 120). The digital camera and/or digital video camera of the imaging devices 112A, 106A1, 106B1, and 106C1 may be configured, as disclosed herein, to take, capture, or otherwise generate digital images and, at least in some embodiments, may store such images in a memory of a respective device (e.g., image database 108, database 114, cloud-based server 122).

For example, the imaging devices 112A, 106A1, 106B1, and 106C1 may include a photo-realistic camera (not shown) for capturing, sensing, or scanning 2D image data. The photo-realistic camera may be an RGB (red, green, blue) based camera for capturing 2D images having RGB-based pixel data. In various aspects, the imaging devices 112A, 106A1, 106B1, and 106C1 may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. More generally, it should be appreciated that the imaging devices 112A, 106A1, 106B1, and 106C1 may include any suitable imaging components, and may be configured to capture any suitable type of images.

In some aspects, the imaging devices 112A, 106A1, 106B1, and 106C1 may also process the 2D image data/datasets and/or 3D image datasets for use by other devices (e.g., the feature extractor model 120). For example, the imaging devices 112A, 106A1, 106B1, and 106C1 may include one or more processors (not shown) to process the image data or datasets captured, scanned, or sensed by the imaging devices 112A, 106A1, 106B1, and 106C1 by localizing (e.g., identifying and cropping) the asset included within the image data. The processing of the image data may generate post-imaging data that may include metadata, simplified data, normalized data, result data, status data, or alert data as determined from the original scanned or sensed image data. The image data and/or the post-imaging data may be sent to the image database 108, the database 114, the cloud-based server 122 for further processing, viewing, manipulation, and/or otherwise interaction. In other embodiments, the image data and/or the post-imaging data may be sent to a server for storage or for further manipulation. As described herein, the image database 108, the database 114, the cloud-based server 122, and/or another external server or other centralized processing unit and/or storage may store such data, and may also send the image data and/or the post-imaging data to another application implemented on a user device, such as the user computing device 116 (e.g., a mobile device, a tablet, a handheld device, or a desktop device).

The user computing device 116 may comprise one or more operator workstations, and may include one or more processors (not shown), one or more memories (not shown), a networking interface (not shown), an input/output (I/O) interface (not shown), and the virtual search engine 118. A user may utilize the user computing device 116 to input a query to the visual search engine 118 in order to query the database 114. In response, the visual search engine 118 may generate and transmit a list of known assets for display to the user on a display of the user computing device 116. The list of known assets may generally correspond to assets that have images and metadata from the frontend 102 stored in the database 114, and the visual search engine 118 may compare features from the images and metadata of these known assets to the lost asset image and associated metadata to determine the known assets that most likely correspond to the lost asset. The visual search engine may rank the list of known assets, such that the user may view the list of known assets in order of their respective similarity to the lost asset, as determined by the visual search engine 118.

However, prior to the visual search engine 118 evaluating the database 114 to determine the list, the feature extractor model 120 may analyze each transmitted set of images and metadata for the known assets and the lost asset to determine descriptors corresponding to each known asset and the lost asset. Generally, the feature extractor model 120 may analyze each image, and may characterize each feature identified within the image by a descriptor, as discussed further herein. Each descriptor may be a vector of real numbers that is a numerical interpretation of the feature associated with an asset identified within each image. The visual search engine 118 may compare these vectors to determine a metric distance between each pair of vectors that represent the same feature type (e.g., size, shape, color, etc.). For example, the size of a respective asset may correspond to a vector of real numbers wherein each numerical value within the vector and/or the aggregate string of numerical values corresponds to an aspect of the size of the respective asset. Thus, the visual search engine 118 may compare each numerical value within the vector in a piecewise fashion and/or compare the aggregate vectors to determine the metric distance between the descriptor vectors for the size feature type, and in general, for each particular feature type.

Additionally, or alternatively, the database 114 configured to receive asset images and metadata may be implemented as and/or communicatively connected to one or more cloud-based servers 122, such as a cloud-based computing platform. For example, the database 114 may be and/or may be connected via a network to any one or more cloud-based platform(s) such as MICROSOFT AZURE, AMAZON AWS, or the like. In certain aspects, the feature extractor model 120 may also be stored on such a cloud-based server 122, and the database 114 may forward asset images and metadata and/or otherwise receive asset descriptors from the cloud-based server 122 when the feature extractor model 120 generates the asset descriptors.

Figure 2:
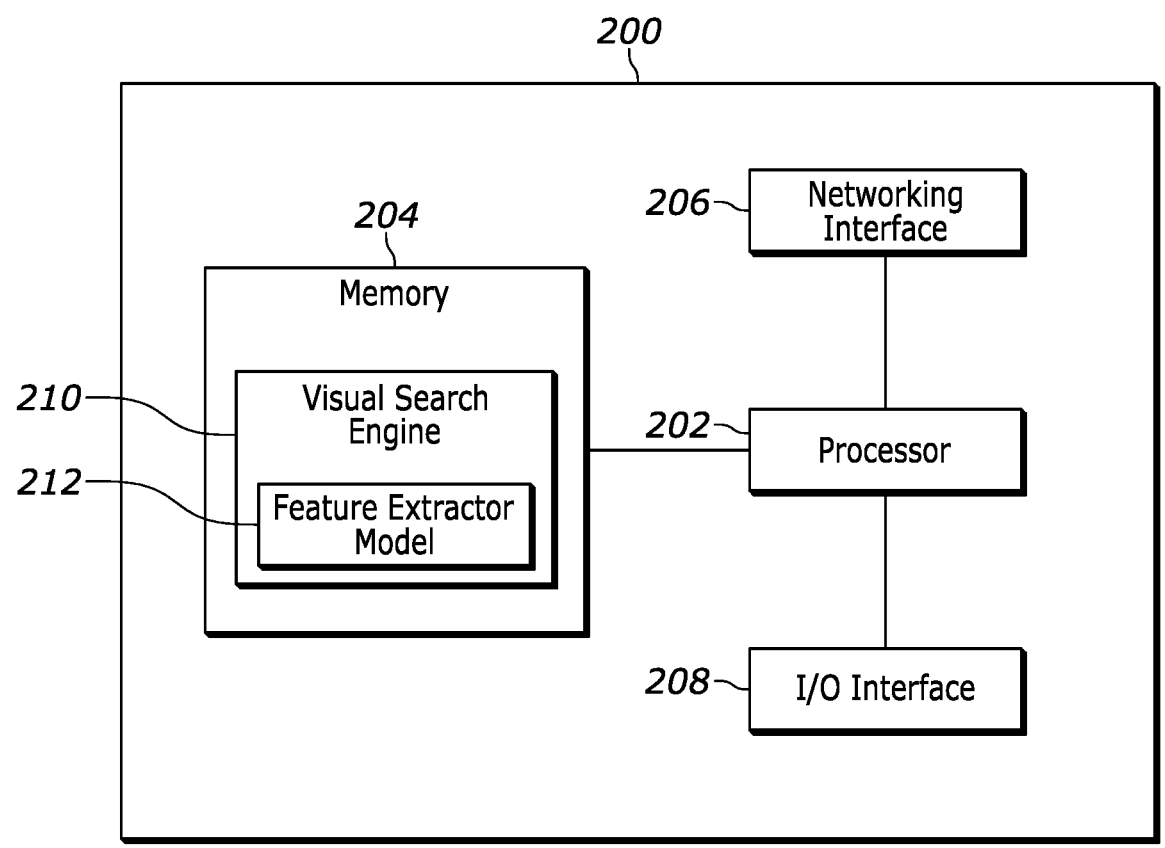
FIG. 2 is a block diagram of an example logic circuit for implementing example methods and/or operations described herein.

FIG. 2 is a block diagram representative of an example logic circuit capable of implementing, for example, one or more components of the example user computing device 116 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. It should be understood that each of the processor 202, the memory 204, and/or any other component of the processing platform 200 may include and/or otherwise represent multiple processors, memories, components, etc.

In any event, the example processor 202 may be connected to the memory 204 via a computer bus responsible for transmitting electronic data, data packets, or otherwise electronic signals to and from the example processor 202 and the memory 204 in order to implement or perform the machine readable instructions, methods, processes, elements or limitations, as illustrated, depicted, or described for the various flowcharts, illustrations, diagrams, figures, and/or other disclosure herein.

The memory 204 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., visual search engine 210, feature extractor model 212, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the example processor 202 (e.g., working in connection with the respective operating system in the memory 204) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The memory 204 may include the visual search engine 210 and the feature extractor model 212 that are each accessible by the example processor 202. The visual search engine 210 and the feature extractor model 212 may comprise rule-based instructions, an artificial intelligence (AI) and/or machine learning-based model, and/or any other suitable algorithm architecture or combination thereof configured to, for example, perform lost asset management based on images captured by imaging devices (e.g., 106A1, 106B1, 106C1, 112A). To illustrate, the example processor 202 may access the memory 204 to execute the visual search engine 210 and/or the feature extractor model 212 in order for a user to query a database (e.g., database 114) in an attempt to locate and/or otherwise identify a lost asset. Machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon. Moreover, the visual search engine 210 and/or the feature extractor model 212 may also be stored in a memory of the imaging devices (e.g., 106A1, 106B1, 106C1, 112A), and/or in an external database (e.g., database 114, cloud-based server 122), which is accessible or otherwise communicatively coupled to the user computing device 116 via a network.

The memory 204 may additionally store an operating system (OS) (e.g., Microsoft Windows, Linux, Unix, etc.) capable of facilitating the functionalities, apps, methods, or other software as discussed herein. The memory 240 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the visual search engine 210 and/or the feature extractor model 212, where each may be configured to facilitate their various functionalities discussed herein. It should be appreciated that one or more other applications may be envisioned and that are executed by the example processor 202.

The example processor 202 may interface with the memory 204 using the computer bus to execute the operating system (OS). The example processor 202 may also interface with the memory 204 using the computer bus to create, read, update, delete, or otherwise access or interact with the data stored in the memory 204 and/or external databases (e.g., a relational database, such as Oracle, DB2, MySQL, or a NoSQL based database, such as MongoDB). The data stored in the memory 204 and/or an external database may include all or part of any of the data or information described herein, including, for example, images captured by imaging devices (e.g., 106A1, 106B1, 106C1, 112A) in response to an asset arriving at a dimensioning area (e.g., 106A, 106B, 106C), a lost asset arriving at an OS&D area (e.g., 112), and/or other suitable information.

The example processing platform 200 of FIG. 2 also includes a networking interface 206 to enable communication with other machines via, for example, one or more networks. The example networking interface 206 includes any suitable type of communication interface(s) (e.g., wired and/or wireless interfaces) configured to operate in accordance with any suitable protocol(s) (e.g., Ethernet for wired communications and/or IEEE 802.11 for wireless communications). For example, the networking interface 206 may be configured to communicate (e.g., send and receive) data via one or more external/network port(s) to one or more networks or local terminals, described herein. In some embodiments, networking interface 206 may include a client-server platform technology such as ASP.NET, Java J2EE, Ruby on Rails, Node.js, a web service or online API, responsive for receiving and responding to electronic requests. The networking interface 206 may implement the client-server platform technology that may interact, via the computer bus, with the memory 204 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interface 206 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to the network by which, for example, components of the example system 100 correspond. In some embodiments, the network may comprise a private network or local area network (LAN). Additionally, or alternatively, the network may comprise a public network such as the Internet. In some embodiments, the network may comprise routers, wireless switches, or other such wireless connection points communicating to the user computing device 116 (by the networking interface 206) and the imaging devices (e.g., 106A1, 106B1, 106C1, 112A) by wireless communications based on any one or more of various wireless standards, including by non-limiting example, IEEE 802.11a/b/c/g (WIFI), the BLUETOOTH standard, or the like.

The example processing platform 200 of FIG. 2 also includes input/output (I/O) interfaces 208 to enable receipt of user input and communication of output data to the user. Generally, the I/O interfaces 208 may include or implement operator interfaces configured to present information to an administrator or operator and/or receive inputs from the administrator or operator. An operator interface may provide a display screen (e.g., by the user computing device 116) which a user/operator may use to visualize any images, graphics, text, data, features, pixels, and/or other suitable visualizations or information. For example, the user computing device 116 may comprise, implement, have access to, render, or otherwise expose, at least in part, a graphical user interface (GUI) for displaying images, graphics, text, data, features, pixels, and/or other suitable visualizations or information on the display screen. The I/O interfaces 208 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 116. According to some embodiments, an administrator or user/operator may access the user computing device 116 to review images or other information (e.g., a ranked list of known assets), make changes, input responses and/or selections, and/or perform other functions.

Further, as previously described, and in some embodiments, the user computing device 116 (e.g., by the visual search engine 210 and/or the feature extractor model 212) may perform the functionalities as discussed herein as part of a "cloud" network or may otherwise communicate with other hardware or software components within the cloud (e.g., cloud-based server 122) to send, retrieve, or otherwise analyze data or information described herein.

Figure 3:
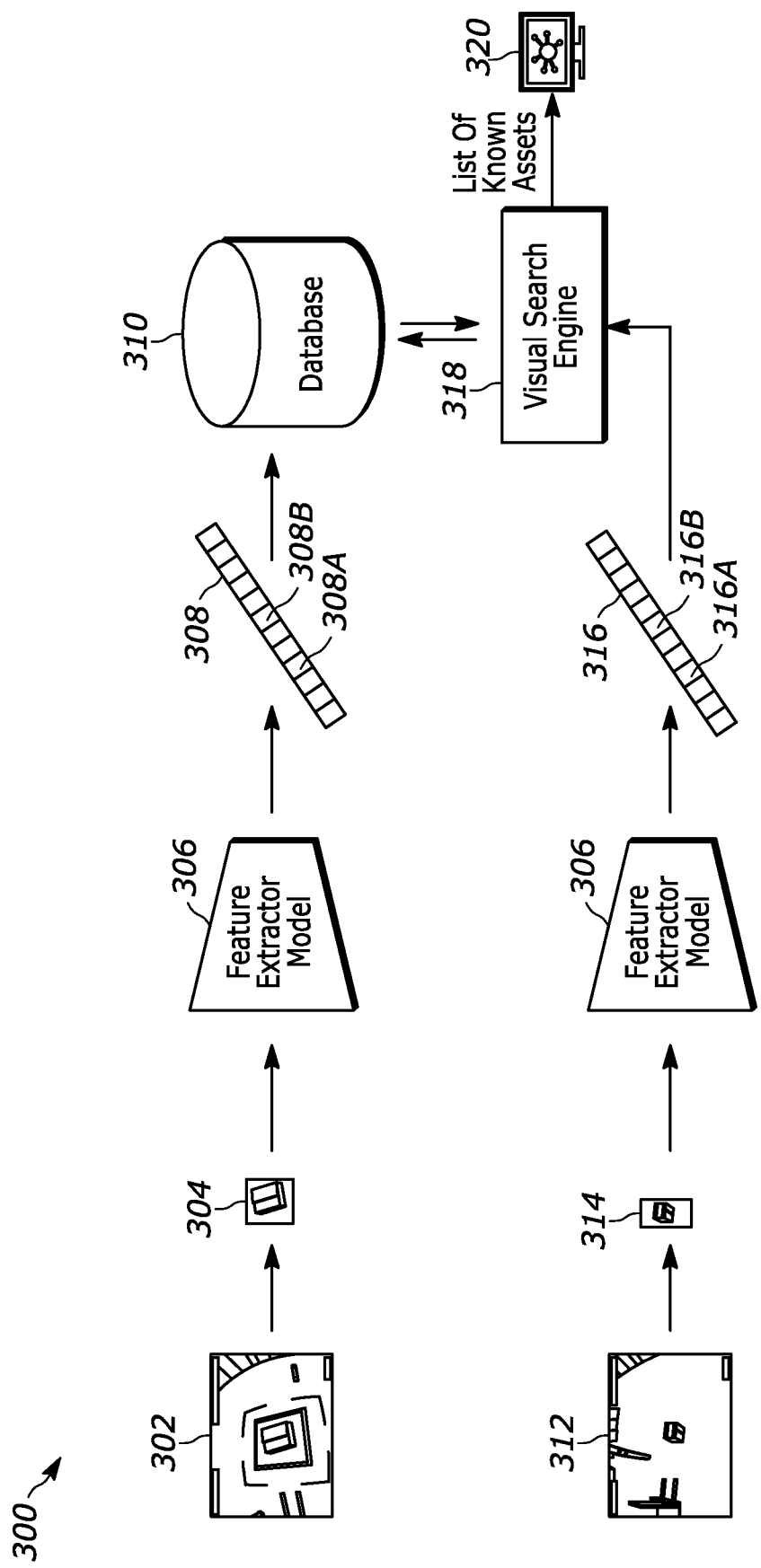
FIG. 3 depicts an example photo-matching workflow using components of the example system of FIG. 1, in accordance with embodiments of the present disclosure.

FIG. 3 depicts an example photo-matching workflow 300 using components of the example system of FIG. 1, in accordance with embodiments of the present disclosure. The example photo-matching workflow 300 includes an initial image 302 captured by, for example, an imaging device 106A1, 106B1, 106C1 at a dimensioning area 106A, 106B, 106C. The initial image 302 may represent an asset (e.g., asset 106A2, 106B2, 106C2) sitting in a dimensioning area 106A, 106B, 106C, wherein the asset is awaiting shipment to a destination. The initial image 302 may be analyzed and the asset may be localized within the image 302, such that the remainder of the image that is not the asset (referenced herein as "background noise") may be removed, resulting in the localized asset image 304. For example, the feature extractor model 306 may analyze the initial image 302, identify the asset, and may crop the background noise to generate the localized asset image 304.

In any event, the feature extractor model 306 may then analyze the asset within the localized asset image 304 and generate a descriptor 308 that represents features of the asset within the image 304. Generally, the descriptor 308 may be a vector of real numbers that represents the features of the asset within the image 304. The feature extractor model 306 may generate each numerical value within the descriptor 308 in a feature-by-feature fashion and/or generate individual vectors for each feature type. As a previously mentioned example, the descriptor 308 may correspond to a size of a respective asset, wherein a numerical value within the descriptor 308 and/or the aggregate numerical values of the descriptor 308 corresponds to the size of the respective asset. More specifically, the numerical value represented by box 308A may correspond to the size of the respective asset, and/or the entire descriptor 308 may represent the size of the respective asset. Similarly, the descriptor 308 may include and/or otherwise fully correspond to a shape of the respective asset, such that a different numerical value within the descriptor 308 (e.g., represented by box 308B) and/or the aggregate numerical values of the descriptor 308 corresponds to the shape of the respective asset. Thus, the feature extractor model 306 may output one or more descriptors 308 corresponding to each respective asset represented by a respective localized asset image 304.

In certain aspects, the feature extractor model 306 may output the descriptor 308 based on training using a plurality of training asset images as input. The feature extractor model 306 may be a convolutional neural network (CNN) trained with a plurality of training asset images to output a plurality of training descriptors that represent features of the plurality of training asset images.

Each descriptor 308 may be uploaded and stored on a database 310 that may also receive any of the initial image 302, the localized asset image 304, metadata associated with the descriptor 308 such as a timestamp corresponding to a time when the initial image 302 was captured and/or a location/routing corresponding to the location where the initial image 302 was captured, and/or any other suitable data corresponding to the initial image 302 or combinations thereof. For example, the database 310 may correspond to the database 114 of FIG. 1.

Continuing the workflow 300, an imaging device (e.g., 112A) may capture a lost asset image 312 that features a lost asset located at an OS&D area (e.g., 112). The lost asset image 312 may represent an asset (e.g., asset 112B) sitting in an OS&D area 112, wherein the lost asset is awaiting identification so that the lost asset may eventually be shipped to its destination. The lost asset image 312 may be analyzed and the lost asset may be localized within the image 312, such that the background noise may be removed, resulting in the localized lost asset image 314. For example, the feature extractor model 306 may analyze the lost asset image 312, identify the lost asset, and may crop the background noise to generate the localized lost asset image 304.

In any event, the feature extractor model 306 may then analyze the lost asset within the localized lost asset image 314 and generate a descriptor 316 that represents features of the lost asset within the image 314. The descriptor 316 may be a vector of real numbers that represents the features of the lost asset within the image 314. The feature extractor model 306 may generate each numerical value within the descriptor 316 in a feature-by-feature fashion and/or generate individual vectors for each feature type. For example, the descriptor 316 may correspond to a size of the lost asset, wherein a numerical value within the descriptor 316 and/or the aggregate numerical values of the descriptor 316 corresponds to the size of the lost asset. More specifically, the numerical value represented by box 316A may correspond to the size of the lost asset, and/or the entire descriptor 316 may represent the size of the lost asset. Similarly, the descriptor 316 may include and/or otherwise fully correspond to a shape of the lost asset, such that a different numerical value within the descriptor 316 (e.g., represented by box 316B) and/or the aggregate numerical values of the descriptor 316 corresponds to the shape of the lost asset. Thus, the feature extractor model 306 may output one or more descriptors 316 corresponding to the lost asset represented by the localized lost asset image 314.

The descriptor 316 may be uploaded and stored in the database 310 that may also receive any of the lost asset image 312, the localized lost asset image 314, metadata associated with the descriptor 308 such as a timestamp corresponding to a time when the lost asset image 312 was captured and/or a location/routing corresponding to the specific OS&D area where the lost asset image 312 was captured, and/or any other suitable data corresponding to the lost asset image 312 or combinations thereof. For example, the database 310 may correspond to the database 114 of FIG. 1.

As illustrated in the workflow 300 of FIG. 3, the descriptor 316 may also be analyzed by the visual search engine 318 to thereby identify matching known assets stored in the database 310. The visual search engine 318 may analyze the descriptor 316 by comparing the numerical values of the descriptor 316 to corresponding numerical values in other descriptors (e.g., descriptor 308) stored in the database to calculate metric distances between the lost asset and respective assets represented by the respective stored descriptors. The metric distance may generally represent an overall similarity between two data points, such that when the visual search engine 318 calculates the metric distance between descriptor 308, 316 values representing features (e.g., size, shape, color, etc.) of two different assets, the engine 318 may determine a rough measure of similarity between the two different assets. For example, the visual search engine 318 may compare the numerical values represented by boxes 316A, 316B in descriptor 316 to the corresponding values represented by boxes 308A, 308B in descriptor 308 and calculate a metric distance between the respective values. If the visual search engine 318 calculates a small metric distance between these two sets of values (e.g., 308A-B, 316A-B), then the engine 318 may determine that the assets represented in the images (e.g., 304, 314) are likely to be the same asset. Alternatively, if the visual search engine 318 calculates a large metric distance between these two sets of values (e.g., 308A-B, 316A-B), then the engine 318 may determine that the assets represented in the images (e.g., 304, 314) are likely not the same asset. Of course, the visual search engine 318 may calculate a metric distance based on the entire descriptor 308, 316 and/or a composite metric distance based on the metric distances calculated for each respective corresponding pair of descriptors associated with two respective images of assets.

More specifically, the visual search engine 318 may perform a nearest neighbor search in order to return a ranked list of known assets that may correspond to the lost asset represented in the localized lost asset image 314. The visual search engine 318 may filter the descriptors (e.g., 308) included in the database 310 prior to performing the search based on the metadata associated with each descriptor, and may thereafter rank the assets represented by the images based on the calculated metric distance between the respective descriptors. For example, the visual search engine 318 may reduce the descriptors available for metric distance calculation by determining which of the descriptors includes a routing that includes the known location of the OS&D area where the lost asset image 312 was captured. Based on this reduced set of descriptors stored in the database 310 corresponding to known assets (e.g., the asset represented in localized asset image 304), the visual search engine 318 may proceed to calculate a metric distance between the descriptor 316 and each descriptor corresponding to a known asset.

Accordingly, once the visual search engine 318 completes the metric distance calculation for each descriptor corresponding to a known asset, the engine 318 may create a list of known assets based on the metric distance, and may transmit the list of known assets to a user workstation 320 for viewing by a user. In certain aspects, the user workstation 320 may correspond to the user computing device 116 of FIG. 1. At this point, and as discussed further herein, a user may select a known asset as correctly corresponding to the lost asset represented by the localized lost asset image 314, and the user may print a new shipping label identifying the lost asset for shipping to its appropriate destination.

Figure 4:
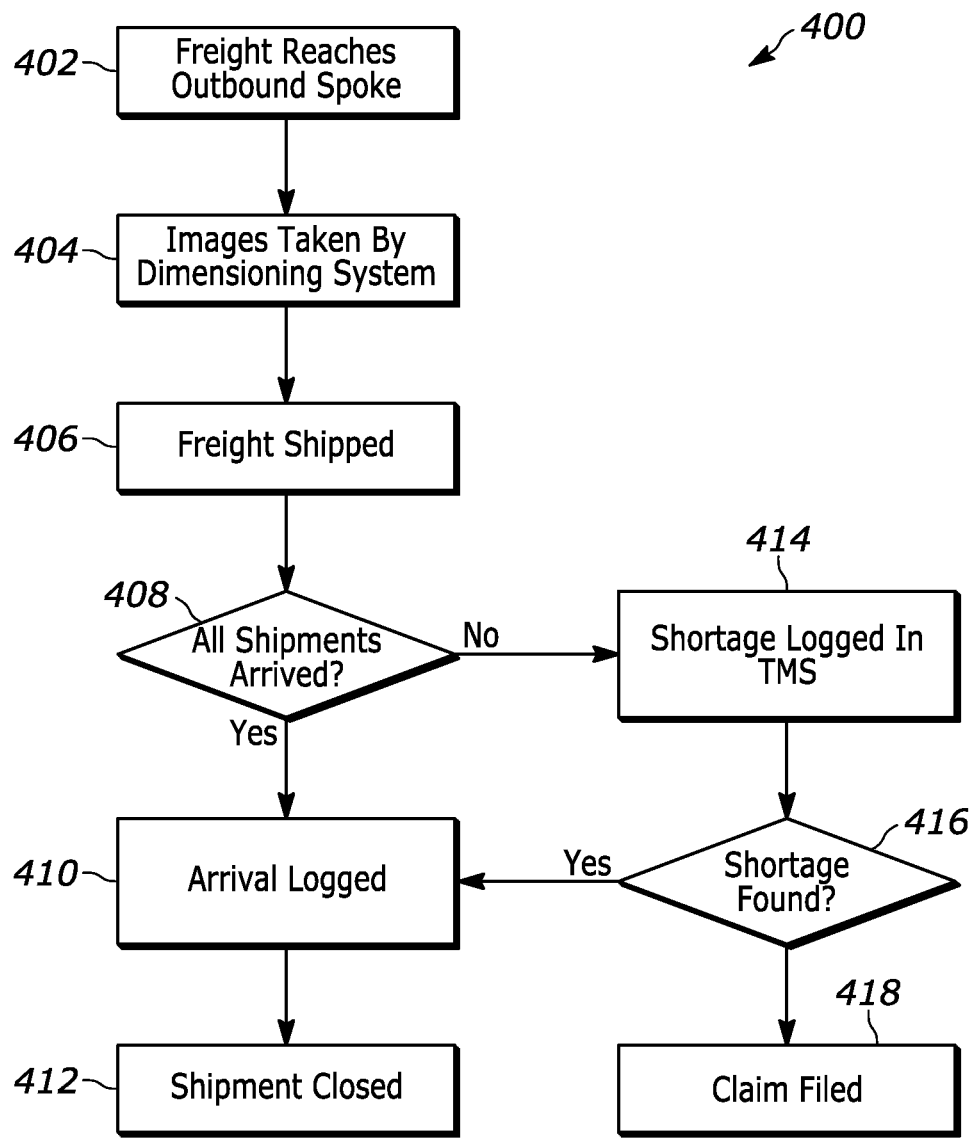
FIG. 4 is a flowchart representative of an example method for identifying that an asset has been lost, in accordance with embodiments described herein.

Thus, as illustrated and described in FIGS. 1-3, the techniques of the present disclosure enable a user to quickly and easily identify lost assets through the user of a visual search engine and feature extractor model. However, to provide a general understanding of how lost asset identification integrates into the overall workflow of a LTL service provider's business, FIG. 4 illustrates an example method 400 for identifying that an asset has been lost, in accordance with embodiments described herein. Each block described herein may be optional in certain embodiments. Further, while the actions included as part of the method 400 are described herein as being executed and/or otherwise performed by processor 202, it is to be understood that each of the actions included as part of the method 400 may be performed by any suitable processor and/or other suitable components.

The method 400 includes freight reaching an outbound spoke (e.g., 106A, 106B, 106C) of a transportation route associated with the freight (block 402). An imaging device (e.g., 106A1, 106B1, 106C1) located at the outbound spoke may capture one or more images of the freight as part of the dimensioning process (block 404). Once the freight has been properly dimensioned and the images and metadata have been uploaded to a database (e.g., database 114, 310), then the freight may be shipped along the transportation route (block 406). The freight may make stops at the pre-planned or otherwise locations along the transportation route until the transportation vehicle eventually reaches the ultimate destination for the freight (also referenced as the "freight destination"). At the freight destination, workers may offload the freight and may scan the shipping labels attached or otherwise associated with the freight to register that the freight has arrived at the freight destination. Additionally, or alternatively, the workers may move the freight to an imaging area (e.g., 106A, 106B, 106C) where the freight is imaged and analyzed to determine whether or not the freight has been offloaded at the correct location.

In any event, once the offloading is complete, the processor (e.g., processor 202) may cross-check the registered freight/shipments with a list of freight/shipments that should have arrived to determine whether or not all of the freight/shipments arrived at the freight destination (block 408). If the processor determines that all freight/shipments have arrived at the appropriate freight destination (YES branch of block 408), then the method 400 may proceed to block 410 where the arrival of the freight/shipments is logged as complete, and the shipment is closed within the system (block 412).

However, if the processor determines that all freight/shipments have not arrived at the appropriate freight destination (NO branch of block 408), then the method 400 may proceed to block 414 where the shortage is logged in the TMS (e.g., TMS system 110). Thereafter, the TMS may prompt, a user may query, and/or the system (by the processor) may otherwise proceed to attempt to locate the freight/shipment(s) represented by the shortage (block 416). In the event that the processor is able to identify/locate the shortage (YES branch of block 416), then the method 400 may proceed to block 410. However, if the processor is unable to identify/locate the shortage (NO branch of block 416), then the method 400 may proceed to block 418, where the processor and/or a user may file a claim in order to register that the shortage was recorded and unidentified/not located.

Each of blocks 414, 416, and 418 may represent an atypical circumstance in the overall workflow of a LTL service provider's business because shipments may not normally be lost/misplaced. Specifically, identifying/locating the shortage at block 416 is the action which the techniques of the present disclosure improve, so that block 418 (filing a claim) is very rarely reached and the remainder of the normal workflow (e.g., blocks 410, 412) may be resumed without further interruption or delay. Accordingly, the example method 500 of FIG. 5 provides a more in-depth discussion of identifying/locating the shortage at block 416.

Figure 5:
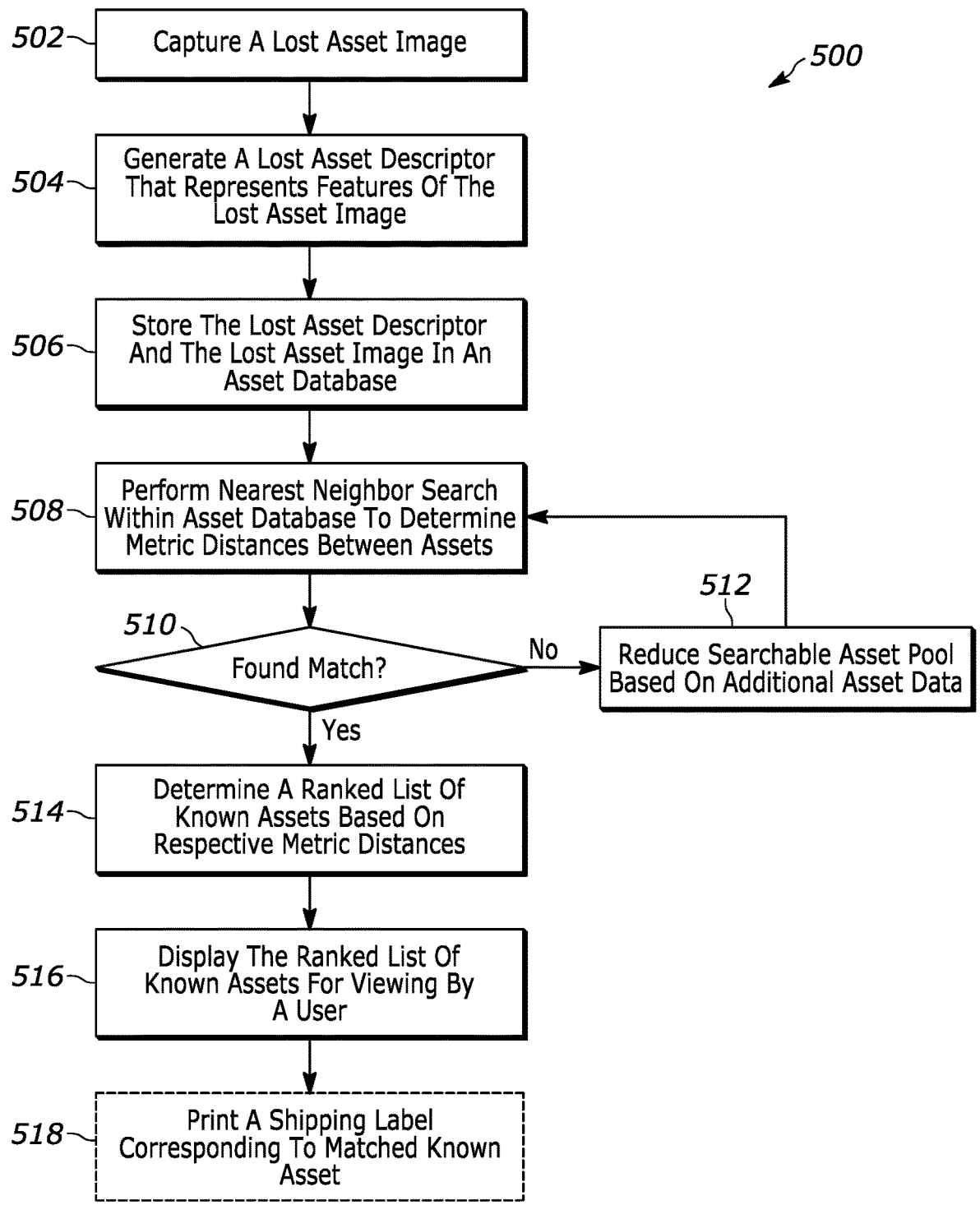
FIG. 5 is a flowchart representative of an example method for lost asset management using photo-matching, in accordance with embodiments described herein.

FIG. 5 is a flowchart representative of an example method 500 for lost asset management using photo-matching, in accordance with embodiments described herein. Each block described herein may be optional in certain embodiments. Further, while the actions included as part of the method 500 are described herein as being executed and/or otherwise performed by processor 202, it is to be understood that each of the actions included as part of the method 500 may be performed by any suitable processor and/or other suitable components.

The method 500 includes capturing a lost asset image corresponding to a lost asset (block 502). An imaging device (e.g., imaging device 112A) located at an OS&D area (e.g., OS&D area 112) may capture the lost asset image (e.g., lost asset image 312). The method 500 also includes generating a lost asset descriptor that represents features of the lost asset image (block 504). Generally, a processor (e.g., processor 202) may apply a feature extractor model (e.g., feature extractor model 120, 212, 306) to the lost asset image to generate the lost asset descriptor (e.g., descriptor 316).

In certain aspects, the processor may also identify the lost asset within the lost asset image, and localize the lost asset by removing background noise from the lost asset image. For example, and as illustrated in FIG. 3, the processor may identify the lost asset within the lost asset image 312 and remove the background noise from the image 312 to generate the localized lost asset image 314. The localization and background noise removal may be performed by any suitable filtering technique and/or combinations thereof.

Moreover, in certain aspects, the feature extractor model is a convolutional neural network (CNN) trained with plurality of training asset images to output a plurality of training descriptors that represent features of the plurality of training asset images. Generally, machine learning may involve identifying and recognizing patterns in existing data (such as generating descriptors corresponding to asset(s) within training images) in order to facilitate making predictions or identification for subsequent data (such as using the model on a new image featuring a lost asset in order to determine or generate a lost asset descriptor corresponding to the lost asset within the new image). Machine learning model(s), such as the AI based learning models (e.g., included as part of the feature extractor model 120, 212, 306) described herein for some aspects, may be created and trained based upon example data (e.g., "training data") inputs or data (which may be termed "features" and "labels") in order to make valid and reliable predictions for new inputs, such as testing level or production level data or inputs.

The supervised machine learning model included as part of the feature extractor model, may be trained using one or more supervised machine learning techniques. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

For example, in these aspects, the supervised machine learning model may employ a neural network, which may be a convolutional neural network (CNN), a deep learning neural network, or a combined learning module or program that learns in two or more features or feature datasets (e.g., training asset images) in particular areas of interest. The machine learning programs or algorithms may also include natural language processing, semantic analysis, automatic reasoning, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on the user computing device (116, 320), the database (114, 310), the processing platform 200, the cloud-based server 122, and/or any other suitable device or combinations thereof. For example, libraries may include the TENSORFLOW based library, the PYTORCH library, and/or the SCIKIT-LEARN Python library.

In particular, the supervised machine learning model that is included as part of the feature extractor model may be trained with a plurality of training asset images and corresponding ground truth descriptors. Specifically, the supervised machine learning model may be configured to receive an input asset image (e.g., localized asset image 304) and output a descriptor (e.g., descriptor 308) as a result of the training performed using the plurality of training asset images and corresponding ground truth descriptors. The output of the supervised machine learning model during the training process (e.g., training descriptors) may be compared with the corresponding ground truth descriptors. In this manner, the feature extractor model may accurately and consistently generate descriptors that represent features of lost assets because the differences between the training descriptors and the corresponding ground truth descriptors may be used to modify/adjust and/or otherwise inform the weights/values of the supervised machine learning model (e.g., an error function).

It should be understood that, while described herein as being trained using a supervised machine learning technique, in certain aspects, the AI based learning models described herein may be trained using multiple supervised/ unsupervised machine learning techniques. Moreover, it should be appreciated that the descriptor generations may be performed by a supervised/unsupervised machine learning model and/or any other suitable type of machine learning model or combinations thereof.

For example, the machine learning model included as part of the feature extractor model may be trained using one or more unsupervised machine learning techniques. In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. Thus, in these aspects, the unsupervised machine learning model included as part of the feature extractor model may be comprised of any suitable unsupervised machine learning model, such as a neural network, which may be a deep belief network, Hebbian learning, or the like, as well as method of moments, principal component analysis, independent component analysis, isolation forest, any suitable clustering model, and/or any suitable combination thereof.

Regardless, training the AI based learning models (e.g., included as part of the feature extractor model 120, 212, 306) described herein may also comprise retraining, relearning, or otherwise updating models with new, or different, information, which may include information received, ingested, generated, or otherwise used over time. Moreover, in various aspects, the AI based learning models (e.g., included as part of the feature extractor model 120, 212, 306) may be trained, by one or more processors (e.g., processor(s) 202 of user computing device 116, processors included as part of the cloud-based server 122, and/or other suitable processors or combinations thereof) with the pixel data of a plurality of training asset images each including assets.

Returning to the method 500, a processor may store the lost asset descriptor and the lost asset image in an asset database (block 506). The asset database (e.g., database 114, 310) may include known asset descriptors and corresponding known asset images. In certain aspects, the lost asset descriptor and the known asset descriptors correspond to vectors including real numbers, and the metric distance corresponds to differences between respective vectors associated with the known asset descriptors and the lost asset descriptor. Moreover, in certain aspects, for each known asset represented in the asset database, the asset database further includes one or more of (i) an asset location, (ii) an asset routing, (iii) an asset size, (iv) an asset pallet type, (v) an asset date, or (vi) an asset delivery status.

The method 500 may also include performing, by a visual search engine (e.g., visual search engine 118, 210, 318), a nearest neighbor search within the asset database to determine a respective metric distance between the lost asset descriptor and at least some of the known asset descriptors (block 508). Ideally, the asset database will include at least an image of the lost asset at an initial loading location (e.g., dimensioning area 106A, 106B, 106C) prior to transportation, so that the visual search engine may identify an image with an asset that matches the lost asset.

Accordingly, in certain aspects, the imaging device is a first imaging device at an orphaned asset bay, and the method 500 further includes capturing, by a second imaging device coupled to a transportation management system (TMS), an initial image of the lost asset prior to transporting the lost asset. In these aspects, the method 500 additionally includes storing, in the asset database, the initial image and an initial descriptor generated from the initial image; registering, by the TMS, a shortage of assets corresponding to the lost asset in the asset database when a designated transportation vehicle arrives at a destination of the lost asset without the lost asset; and comparing, by the visual search engine, at least the initial descriptor to the lost asset descriptor as part of the nearest neighbor search. In this manner, the asset database may include the initial image of the lost asset, such that when the visual search engine performs the nearest neighbor search, the engine will identify the initial image as including a matching asset to the lost asset.

The method 500 also includes determining whether or not the visual search engine has identified a matching image/asset (block 510). It should be understood that a matching image/asset as described herein may refer to an asset image (e.g., localized asset image 304) and/or the asset featured in the asset image based on the characteristics derived from the asset image (e.g., asset size, asset shape, asset color, etc.). Regardless, for the purposes of discussion only, a matching image/asset will be referred to herein as a "matching asset".

In any event, if the visual search engine has not identified a matching asset (NO branch of block 510), then the method 500 proceeds to block 512, where the processors reduce the searchable asset pool within the asset database based on additional asset data. For example, the processors may filter images within the asset database based on metadata included with the images (e.g., location data, routing data, image timestamp, etc.) in order to perform the nearest neighbor search on only the most likely matching assets in the asset database. This reduction of the searchable assets within the database minimizes additional processing time and increases the overall system efficiency to thereby quickly generate results for the user. Thus, once the filters are applied by the processors, the method 500 may return to block 508 to repeat the nearest neighbor search with the filters applied.

However, if the visual search engine has identified a matching asset (YES branch of block 510), then the method 500 proceeds to block 514, where the processors determine a ranked list of known assets based on the respective metric distances. More specifically, the processors may cause the visual search engine to determine a ranked list of known assets corresponding to the lost asset, wherein the ranked list of assets is prioritized based on the respective metric distance between the lost asset descriptor and the at least some of the known asset descriptors. As previously described, the visual search engine may calculate metric distances between the lost asset and known assets based on the numerical values included in the vector(s) comprising the lost asset descriptor (e.g., descriptor 316) and the known asset descriptors (e.g., descriptor 308). The length of the metric distance may bear an inverse relationship to the similarity between a known asset and the lost asset, such that a relatively small metric distance indicates a relatively high degree of similarity and a relatively large metric distance indicates a relatively lower degree of similarity. Accordingly, the visual search engine may rank the known assets by placing the known assets with the smallest respective metric distances higher on the list (e.g., first, second, etc.) than the known assets with the largest respective metric distances.

The method 500 may also include displaying, at a user interface, the ranked list of known assets for viewing by a user (block 516). For example, the processors may render the ranked list of assets at a user interface of a user computing device (e.g., 116, 320), and the user may view the ranked list for analysis and selection of a matching asset. To that end, in certain aspects, the method 500 may also include receiving, from the user, an indication that no known asset listed on the ranked list of known assets corresponds to the lost asset. In this circumstance, the method 500 may return to block 508 where the visual search engine may re-perform the nearest neighbor search within the asset database by including (i) the asset location, (ii) the asset routing, (iii) the asset size, (iv) the asset pallet type, (v) the asset date, or (vi) the asset delivery status for at least some of the known assets to determine a respective new metric distance between data stored in the asset database representing the lost asset and the at least some of the known assets. Thereafter, the visual search engine may determine a new ranked list of known assets corresponding to the lost asset, wherein the new ranked list of known assets is prioritized based on the respective new metric distance between the data stored in the asset database representing the lost asset and the at least some of the known assets. The processors may then display, at the user interface, the new ranked list of known assets for viewing by the user. Of course, the processors executing the visual search engine may re-perform the search any suitable number of times in order to either produce a matching asset (as indicated by a user), or to receive an input from the user indicating that no asset within the database matches the lost asset.

However, in the event that a user indicates that an asset presented in the ranked list matches the lost asset, the processors may cause a printer or other suitable device to print a shipping label corresponding to the matched known asset (optional block 518). The label may include some/all of the metadata included in the asset database corresponding to the matched known asset as is necessary to transport the lost asset from the OS&D area where it is currently stored to the correct destination, as indicated by the data in the asset database corresponding to the matched known asset. In this manner, the user may quickly and easily affix a shipping label to the lost asset to expedite the transportation process and thereby avoid further delays, customer complaints, and overall transportation inefficiencies.

Additional Considerations

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for lost asset management using photo-matching, the method comprising:
   capturing, by an imaging device, a lost asset image corresponding to a lost asset;
   generating, by applying a feature extractor model to the lost asset image, a lost asset descriptor that represents features of the lost asset image;
   storing the lost asset descriptor and the lost asset image in an asset database, wherein the asset database includes known asset descriptors and corresponding known asset images;
   performing, by a visual search engine, a nearest neighbor search within the asset database to determine a respective metric distance between the lost asset descriptor and at least some of the known asset descriptors;
   determining, by the visual search engine, a ranked list of known assets corresponding to the lost asset, wherein the ranked list of assets is prioritized based on the respective metric distance between the lost asset descriptor and the at least some of the known asset descriptors;

displaying, at a user interface, the ranked list of known assets for viewing by a user;

receiving, from the user, an indication that no known asset listed on the ranked list of known assets corresponds to the lost asset;

re-performing, by the visual search engine, the nearest neighbor search within the asset database by including (i) an asset location, (ii) an asset routing, (iii) an asset size, (iv) an asset pallet type, (v) an asset date, or (vi) an asset delivery status for at least some of the known assets to determine a respective new metric distance between data stored in the asset database representing the lost asset and the at least some of the known assets;

determining, by the visual search engine, a new ranked list of known assets corresponding to the lost asset, wherein the new ranked list of known assets is prioritized based on the respective new metric distance between the data stored in the asset database representing the lost asset and the at least some of the known assets; and displaying, at the user interface, the new ranked list of known assets for viewing by the user.

2. The method of claim 1, further comprising: identifying, by one or more processors coupled to the imaging device, the lost asset within the lost asset image;

and localizing, by the one or more processors, the lost asset by removing background noise from the lost asset image.

3. The method of claim 1, wherein the imaging device is a first imaging device at an orphaned asset bay, and the method further comprises:

capturing, by a second imaging device coupled to a transportation management system (TMS), an initial image of the lost asset prior to transporting the lost asset;

storing, in the asset database, the initial image and an initial descriptor generated from the initial image;

registering, by the TMS, a shortage of assets corresponding to the lost asset in the asset database when a designated transportation vehicle arrives at a destination of the lost asset without the lost asset; and comparing, by the visual search engine, at least the initial descriptor to the lost asset descriptor as part of the nearest neighbor search.

4. The method of claim 1, wherein the feature extractor model is a convolutional neural network (CNN) trained with plurality of training asset images to output a plurality of training descriptors that represent features of the plurality of training asset images.

5. The method of claim 1, wherein the lost asset descriptor and the known asset descriptors correspond to vectors including real numbers, and the metric distance corresponds to differences between respective vectors associated with the known asset descriptors and the lost asset descriptor.

6. A system for lost asset management using photo-matching, the system comprising:

an imaging device configured to capture a lost asset image corresponding to a lost asset; and one or more processors communicatively coupled with the imaging device, wherein the one or more processors are configured to:

generate, by applying a feature extractor model to the lost asset image, a lost asset descriptor that represents features of the lost asset image, store the lost asset descriptor and the lost asset image in an asset database, wherein the asset database includes known asset descriptors and corresponding known asset images, perform a nearest neighbor search within the asset database to determine a respective metric distance between the lost asset descriptor and at least some of the known asset descriptors, determine a ranked list of known assets corresponding to the lost asset, wherein the ranked list of assets is prioritized based on the respective metric distance between the lost asset descriptor and the at least some of the known asset descriptors, cause a user interface to display the ranked list of known assets for viewing by a user, receive, from the user, an indication that no known asset listed on the ranked list of known assets corresponds to the lost asset, re-perform, by the visual search engine, the nearest neighbor search within the asset database by including (i) an asset location, (ii) an asset routing, (iii) an asset size, (iv) an asset pallet type, (v) an asset date, or (vi) an asset delivery status for at least some of the known assets to determine a respective new metric distance between data stored in the asset database representing the lost asset and the at least some of the known assets, determine, by the visual search engine, a new ranked list of known assets corresponding to the lost asset, wherein the new ranked list of known assets is prioritized based on the respective new metric distance between the data stored in the asset database representing the lost asset and the at least some of the known assets, and display, at the user interface, the new ranked list of known assets for viewing by the user.

7. The system of claim 6, wherein the one or more processors are further configured to: identify the lost asset within the lost asset image; and localize the lost asset by removing background noise from the lost asset image.

8. The system of claim 6, wherein the imaging device is a first imaging device at an orphaned asset bay, and the system further comprises:

a second imaging device configured to capture an initial image of the lost asset prior to transporting the lost asset; and wherein the one or more processors are further configured to:

store, in the asset database, the initial image and an initial descriptor generated from the initial image, register a shortage of assets corresponding to the lost asset in the asset database when a designated transportation vehicle arrives at a destination of the lost asset without the lost asset, and compare at least the initial descriptor to the lost asset descriptor as part of the nearest neighbor search.

9. The system of claim 6, wherein the feature extractor model is a convolutional neural network (CNN) trained with plurality of training asset images to output a plurality of training descriptors that represent features of the plurality of training asset images.

10. The system of claim 6, wherein the lost asset descriptor and the known asset descriptors correspond to vectors including real numbers, and the metric distance corresponds to differences between respective vectors associated with the known asset descriptors and the lost asset descriptor.

11. A non-transitory machine-readable medium comprising instructions that, when executed, cause a machine to at least:
- receive a lost asset image corresponding to a lost asset;
- generate, by applying a feature extractor model to the lost asset image, a lost asset descriptor that represents features of the lost asset image;
- store the lost asset descriptor and the lost asset image in an asset database, wherein the asset database includes known asset descriptors and corresponding known asset images;
- perform a nearest neighbor search within the asset database to determine a respective metric distance between the lost asset descriptor and at least some of the known asset descriptors;
- determine a ranked list of known assets corresponding to the lost asset, wherein the ranked list of assets is prioritized based on the respective metric distance between the lost asset descriptor and the at least some of the known asset descriptors;
- cause a user interface to display the ranked list of known assets for viewing by a user;
- receive, from the user, an indication that no known asset listed on the ranked list of known assets corresponds to the lost asset;
- re-perform, by the visual search engine, the nearest neighbor search within the asset database by including (i) an asset location, (ii) an asset routing, (iii) an asset size, (iv) an asset pallet type, (v) an asset date, or (vi) an asset delivery status for at least some of the known assets to determine a respective new metric distance between data stored in the asset database representing the lost asset and the at least some of the known assets;
- determine, by the visual search engine, a new ranked list of known assets corresponding to the lost asset, wherein the new ranked list of known assets is prioritized based on the respective new metric distance between the data stored in the asset database representing the lost asset and the at least some of the known assets; and
- display, at the user interface, the new ranked list of known assets for viewing by the user.

12. The non-transitory machine-readable medium of claim 11, wherein the instructions, when executed, further cause the machine to at least:
- identify the lost asset within the lost asset image; and
- localize the lost asset by removing background noise from the lost asset image.

13. The non-transitory machine-readable medium of claim 11, wherein the instructions, when executed, further cause the machine to at least:
- receive an initial image of the lost asset prior to transporting the lost asset;
- store, in the asset database, the initial image and an initial descriptor generated from the initial image;
- register a shortage of assets corresponding to the lost asset in the asset database when a designated transportation vehicle arrives at a destination of the lost asset without the lost asset; and
- compare at least the initial descriptor to the lost asset descriptor as part of the nearest neighbor search.

14. The non-transitory machine-readable medium of claim 11, wherein the feature extractor model is a convolutional neural network (CNN) trained with plurality of training asset images to output a plurality of training descriptors that represent features of the plurality of training asset images.

* * * * *